United States Patent [19]

Lindbloom et al.

[11] Patent Number: 4,917,351
[45] Date of Patent: Apr. 17, 1990

[54] METERING VALVE

[75] Inventors: George R. Lindbloom, Mesa; Anton J. Matics, Scottsdale, both of Ariz.

[73] Assignee: Micro-Flo Technologies, Inc., Tempe, Ariz.

[21] Appl. No.: 323,675

[22] Filed: Mar. 15, 1989

[51] Int. Cl.$^4$ .............................................. F16K 31/06
[52] U.S. Cl. ............................ 251/129.18; 251/129.15; 251/129.05
[58] Field of Search ...................... 251/129.18, 129.15, 251/129.05

[56] References Cited

U.S. PATENT DOCUMENTS 3,762,443  10/1973  Sorenson ......................... 251/368 X
4,556,085  12/1985  Warrick ....................... 251/129.14 X
4,681,142   7/1987  Woeller et al. ............. 251/129.15 X

FOREIGN PATENT DOCUMENTS 2262925  6/1974  Fed. Rep. of Germany ..................... 251/129.18

Primary Examiner—Arnold Rosenthal
Attorney, Agent, or Firm—Gregory J. Nelson

[57] ABSTRACT

An improved metering valve for electromagnetically metering, controlling or dispensing small pulses of fluid or air at high frequency having an electromagnetic valve and an armature moveable within a coil. The valve employs an improved sealing which is resistant to corrosive and chemically-active fluids.

11 Claims, 2 Drawing Sheets

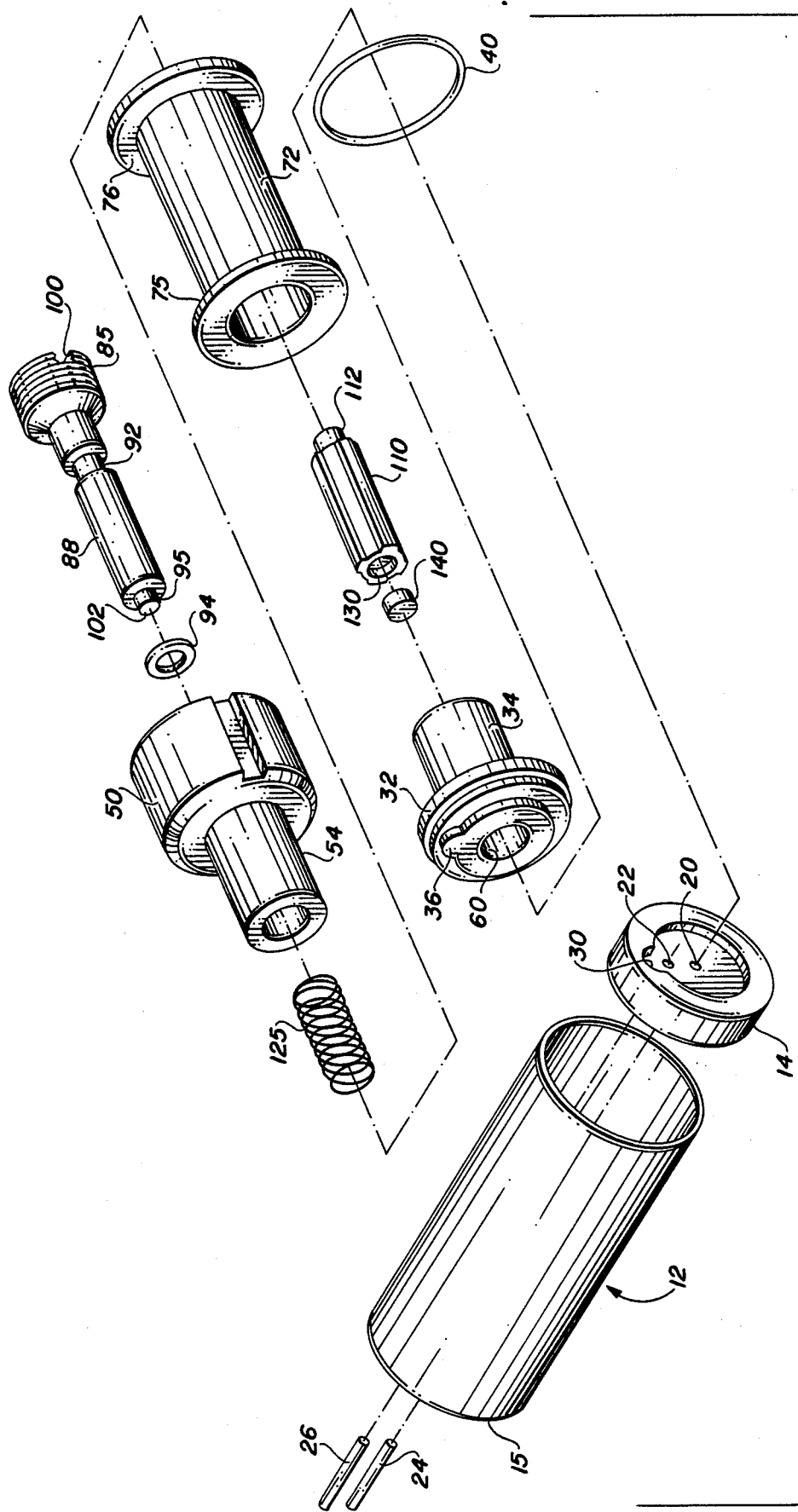

METERING VALVE

The present invention relates to valves and more particularly to a high frequency metering valve for delivering small pulses of fluid or air at high frequency.

Various fast acting or fast response valves or valve systems for controlling, metering and dispensing fluid in small pulses at high frequency can be found in the prior art. These valves are often used in connection with such applications as medical instrumentation systems, industrial process control systems, fluid logic interface systems and more recently in connection with high speed dot matrix printing systems. Valves of this general type must be capable of operating at exceedingly high speeds and be able to control fluids which may be corrosive or chemically active. A further requirement of such valves is that they have a long life and must be able to operate at high frequencies, up to perhaps 1500 Hz.

Generally valves of this type are electrically operated in order to be capable of high frequency on-off operation. For example, U.S. Pat. No. 4,492,360 shows an improved piezoelectric valve of the high frequency on-off type having a cantilever-mounted valve control arm with an outer free end adapted to be piezoelectrically deflected to operate the valve. In accordance with the invention, the cantilever-mounted valve control arm employs a piezoelectric valve operator and a valve operator limit arm which together provide high frequency valve operation without valve flutter or vibration. Application of suitable voltage differentials to an upper and lower piezoelectric layer will deflect the valve operating arm between open and closed positions. The valve is stated to have particular application for supplying air or other gas pulses at high frequency in systems such as those for delivering small pulses of die for programmably and selectively coloring the threads of a woven fabric during a weaving process.

Another valve of this general type is shown in U.S. Pat. No. 3,971,542. This patent shows a valve system including an electromagnetically-operated pilot valve for pneumatically actuating an operating piston of a primary valve for accurately metering, controlling and or dispensing fluid with the primary valve. The pilot valve has an inlet, outlet and exhaust port. A coil is mounted on a spool in the valve body and an armature is moveably positioned relative to the spool so that when the coil is energized, the armature is magnetically withdrawn to open the inlet conduit and close the exhaust or outlet conduit. The entire core, including the end cap, armature and valve member are made from a low reluctance, ferromagnetic material such as soft iron.

While valves of the general type as described above are effective to accurately meter precise volumetric volumes and pulses of fluid, they have certain disadvantages. Generally, prior art valves as represented above are inherently limited to frequency ranges of about 500 Hz. Also, the fluid pulse discharge is not always well regulated or modulated so that valves of this type are not effective in some applications such as high speed dot matrix printing systems. High speed dot matrix printing systems also require extremely high valve frequency range up to 1500 Hz. and also a discrete and well-defined fluid pulse which can be applied to packaging material to form a portion of a sharply defined alphanumeric symbol. Such printing systems also require adjustability of the control valve so the resulting dot size may be changed.

Briefly, the present invention comprehends an elctromagnetic valve having an armature moveable within a coil. The armature has a valve seat at one end of an elastomeric polymeric material which engages a port in the closed position to interrupt flow through the valve. The armature is of a special sintered iron. The armature stop is adjustable so a precise air gap between the armature and stop can be established. The valve is typically controlled by a pulse generator and, although the valve has multiple applications, is particularly suitable for dot matrix printing.

The term "fluid" as used herein includes liquids, air or other gases.

Accordingly, it is an object of the present invention to provide a new and improved fluid metering valve for accurately metering pulse amounts of fluid for medical, printing, fluid dispensing and other industrial process applications.

It is a further object of the present invention to provide a new and improved fluid valve design which operates at high speed up to frequencies having a frequency range up to 1500 Hz.

It is another object of the present invention to provide a new and improved solenoid-type valve for electromagnetically metering, controlling or dispensing fluid to provide a discrete and well-defined fluid pulse.

It is another object of the present invention to provide a solenoid-type metering valve employing new and improved sealing technology which valve is resistant to corrosive fluids and chemically active fluids.

Other objects and advantages of the present invention will become apparent from the following detailed description and the accompanying drawings in which:

FIG. 2 is an exploded perspective view of the metering valve of the present invention;

FIG. 4 is a schematic of a typical driver circuit required to operate the valve of the present invention and FIG. 5 shows an alphanumeric dot pattern applied with a valve according to the invention after a substantial number of operational cycles.

Figure 1:
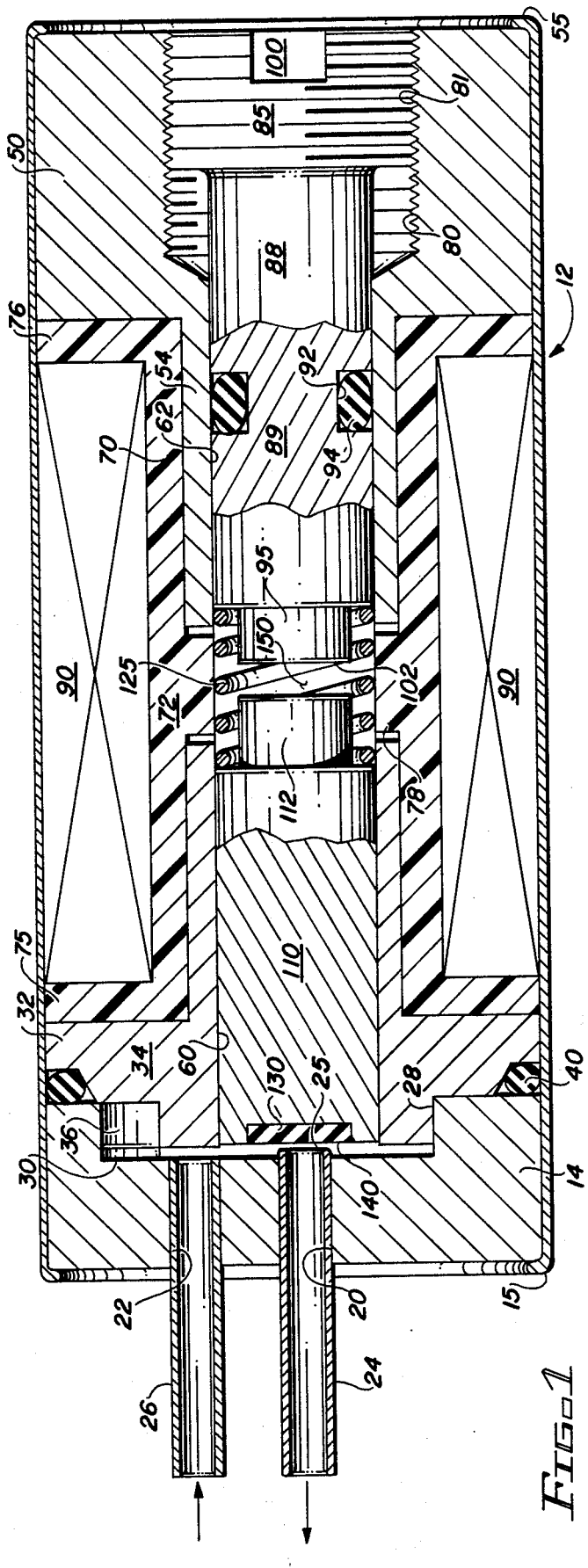
FIG. 1 is a longitudinal view, partly in section, of the metering valve of the present invention.

Referring now to the drawings, particularly FIGS. 1 and 2, the metering valve of the present invention is generally designated by the numeral 10. The valve 10 has a generally cylindrical valve body or casing 12 having an outlet end cap 14. The outlet cap 14 is pressed into one end inwardly turned lip 15 to secure the cap in place. The housing material is selected to optimize magnetic performance and eliminate "cross-talk" between closely mounted valves and typically is 1010 steel or similar material.

The outlet cap is provided with axially extending bore 20 generally aligned with the longitudinal centerline of the casing. Another bore 22 is radially offset from the bore 20. Bore 20 receives a tube 24 which projects interiorly slightly beyond the interior face 25 of the outlet end cap. Tube 24 serves as the valve outlet tube or port. Similarly, bore 22 receives tube 26 which serves as the inlet tube or port and is connectable to a source of fluid such as printer's ink. The tubes are fabricated from a chemically resistant material such as stainless steel.

The inner face 25 of the outlet cap defines a stepped bore 28 having a peripheral, interiorly extending flange 30. Immediately rearward of the outlet end cap 14 is the front retainer 32 having an axially extending body 34 and a radially extending flange 36 which abuts the peripheral flange 30 of the end cap 14. A seal 40 extends annularly within a groove in flange 36.

A rear retainer 50 is provided at the opposite or rear end of the casing and is held in place by a lip portion 55 of the casing. The rear retainer 50 has a longitudinally extending portion 54 terminating at a location spaced apart from the distal end of body portion 34 of the front retainer 32. The front retainer defines an axially extending bore 60 and similarly the rear retainer member defines an axially extending aligned bore 62. The front and rear retainers may be fabricated from various materials preferably a ferrous material such as sintered iron compound. Sintered iron with phosphorous has been found to be particularly suitable. This product is designated ASCO-F000-S (PH) and has approximately 7.0 g/cc phosphorous.

A bobbin 70 is positioned at an intermediate location within the valve casing. The bobbin is preferably fabricated from a suitable non-magnetic plastic material and has a longitudinally extending generally cylindrical body 72 with a front axially extending lip or flange 75 and a rear axially extending lip or flange 76. Spacer member 78 projects radially inward at an intermediate location between the distal ends of body members 34 and 54 of the front and rear retainers.

A suitable coil 90 is mounted on the bobbin and preferably the coil is of wet-layer wound construction using a high quality magnetic wire to insure consistent unit performance. Typically, the coil may consist of 2000 turns of No. 39 wire, 170 OHM±5 OHM resistance.

The rear retainer 50 defines an internal axially extending bore 80 which is threaded at 81 and is in threaded engagement with the outer threaded end 85 of the armature stop 88. The armature stop 88 has an axially extending body member 89 which extends within bore 62 of retainer member 54. An annular groove 92 extends about the periphery of the body 89 of the armature stop and receives a suitable O-ring or seal 94. The inner distal end of armature stop 88 terminates at a location at the approximate mid-point of the valve and has a reduced diameter projection 95. The outer end of the armature stop is slotted at 100 so that the relative axial position of the shoulder 102 and the interior face of the stop projection can be adjusted. The armature stop is fabricated from a suitable material such as magnetic stainless steel.

A generally cylindrical armature 110 is axially slidable within the bore 60 of front retainer member 32. The inner, distal end of armature 110 is stepped having a projection 112 terminating in spaced-apart relationship with respect to face of projection 95. A helical compression spring 125 extends about projections 112 and 95 engaging the opposite shoulders of the rear retainer and the armature. The armature is preferably fabricated from a sintered iron of the same composition as the front and rear retainers. The use of the sintered iron-phosphorous composition is an important aspect of the invention contributing significantly to the superior performance.

The opposite or forward end of the armature defines an axially aligned recess 130 which is filled with a resilient material such as an elastomeric polymer, preferably polyurethane. The elastomeric material serves as a valve seat to positively close off the outlet tube 24 in the valve closed position. A valve chamber 140 is defined between the inner face 25 of the outlet end cap and the front retainer and forward armature end. In the valve closed position, the armature will have moved leftward under the influence of the compression spring bringing the valve seat 130 into engagement with the inner end of outlet tube 24 closing off communication between the valve inlet tube 26 and outlet tube 24 through the valve chamber 140. It will be seen that the diameter of the valve seat 130 is substantially greater than the diameter of the interior end of the inlet tube so complete and positive valve closure is achieved.

An important feature of the invention is the material used in the fabrication of the armature member, retainers and the valve seat. The armature, front retainer and rear retainer are fabricated of sintered iron with phosphorous. The valve seat is of a suitable polymeric, elastomeric material preferably polyurethane. The hardness of the valve seat material is also important and preferably is in the range of 85-95 durometer hardness.

The shiftable armature is electrically controlled through energization of the coil 90. When the coil is energized, armature 110 is magnetically withdrawn, that is shifted rearwardly, moving valve seat 130 away from the inner end of the outlet tube 24 placing the inlet and outlet tube in communication. With the armature in the closed position, a slight air gap 150 exists between the opposed parallel faces of the armature and the rear armature stop. The axial dimension of the air gap can be controlled by adjusting the armature slot by rotating it at slot 100. The smaller the gap, the faster the armature is allowed to cycle.

Upon energizing the coil 90, the armature 110 becomes magnetized and the mutual action of the field in the valve and the pull created on the armature cause the armature to move within the valve. Upon cessation of coil energization, the return spring 125 will cause the armature to quickly move to the left as viewed in FIG. 1, bringing the valve seat into contact with the inner end of the outlet tube 24 closing the valve.

Another important feature is the adjustability of the armature stop 88. This allows the air gap between the rear of the armature 110 and stop 88 to be adjusted. Typically the gap is in the order of 0.005". The adjustment feature can be used to adjust the valve cycling speed or, more importantly, can be adjusted at the time of assembly to precisely pre-set the valve accommodating any tolerance build-ups or variation that may have occurred due to slight variations in component parts. This means that valves may be precisely duplicated for replacement purposes.

Figure 4:
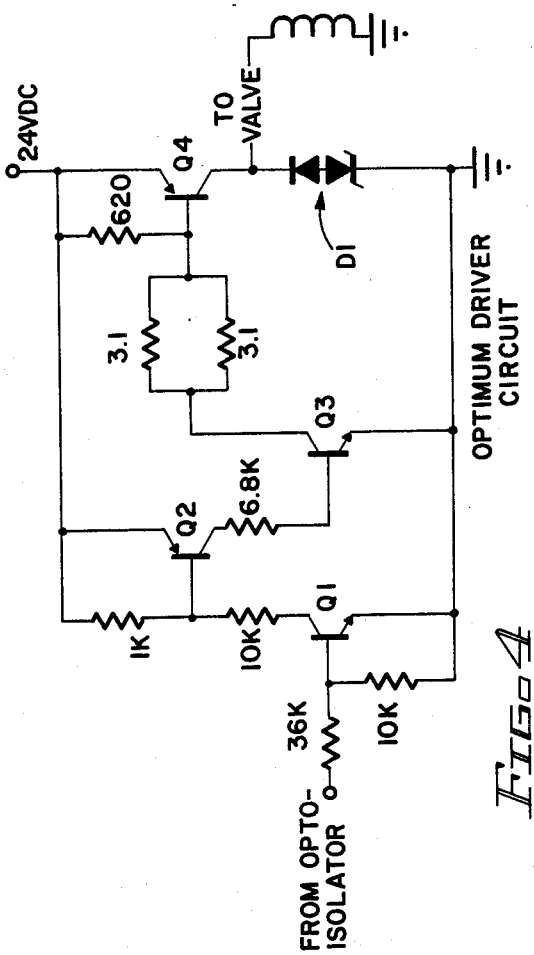

Generally valve 10 will be operated or cycled by a pulse generator of known construction. One example of a driving circuit which has been tested and operated successfully to generate the drive signal for the solenoid valve which is the subject of the present invention is shown in FIG. 4 in which the output signal from an optically-coupled circuit is supplied to the base of transistor Q1. The application of a positive signal to the base of transistor Q1 causes transistor Q2 to be rendered conductive thereby supplying drive to the base of transistor Q3. When transistor Q3 is conductive, the PNP transistor Q4 is turned on thereby providing a positive voltage at output terminal. The output terminal is shown coupled to ground via protective diode Q4 and zener diode 50 to provide transient protection by preventing the output terminal from going more negative than ground or more positive than the breakdown voltage of diode 50.

Figure 3:
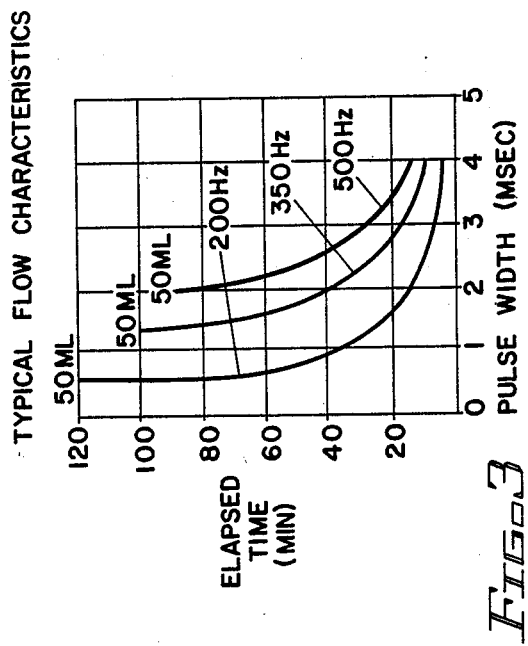
FIG. 3 is a flow diagram representing a typical valve constructed according to the present invention showing the capabilities and a pulse width modulated mode to achieve variation and dispense fluid volume over time.

FIG. 3 is a valve flow diagram which sets forth the capabilities of a valve of the type described above in a pulse width modulated mode to achieve a variation to dispense fluid volume over time.

In order to test the effectiveness of the valve constructed according to the present invention, a valve was constructed as described above. The valve casing which was 0.50" diameter and was 1.3" long. The inlet and outlet ports were each 0.058" OD and 0.041" ID. The valve seat was die cut from stock material which was chemically resistant polyurethane having a durometer hardness of 90. The case was fabricated from 1010 mild steel to optimize magnetic performance and eliminate cross-talk between closely mounted valves as would occur in dot matrix printing arrangements. The magnetic coil was wet-layer wound using a high quality No. 39 wire and consists of approximately 2000 turns. The valve was operated at 4–5 psi to supply ink in a dot matrix printing array having multiple valves of the type arranged to print alphanumeric indicia. 24 VDC were applied using a driver circuit as shown in FIG. 4. The valve operated over a frequency range of between 1 and 2500 Hz. The pule width range of 0.5 to 5.0 mss. The valve was operated to 1.7 billion cycles and the resulting dot pattern after this high number of cycles remained sharp having high resolution. FIG. 5 is representative of this dot pattern at 1.7 billion cycles.

As indicated, the valve 10 may be used to control a variety of fluids. Dot printing is a particularly suitable application. In dot printing, an array of valves, typically seven, are connected to a fluid source. Conventionally, if one valve malfunctions, all have to be replaced due to operational inconsistencies that occur. However, with the valve of the invention, the unique construction and adjustment features permit the replication of existing valves so replacement of a single valve in an array can be accomplished at great savings.

It will be obvious to those skilled in the art to make various changes, alterations and modifications to the high frequency metering valve of the present invention. To the extent such changes, alterations and modifications do not depart from the spirit and scope of the appended claims, they are intended to be encompassed therein.

We claim:

1. A fast-acting metering valve comprising:
   (a) a casing with opposite first and second ends defining an interior chamber with inlet and outlet ports extending through said first end into said chamber;
   (b) an electrical coil extending annularly within said casing;
   (c) first and second retainers located respectively at said first and second ends of said casing being of a ferrous material;
   (d) an armature slidable within said first retainer and extending generally axially therein, said armature having opposite first and second ends, said first end defining a valve seat member engageable with one of said ports in a closed position and in an open position permitting fluid communication between said ports;
   (e) stop means axially aligned with said armature and slidable within said second retainer and defining an air gap between the stop means and the second end of said armature in the valve closed position;
   (f) means at the second end of said casing for axially selectively adjusting the position of said stop means relative to said armature to set the air gap therebetween; and
   (g) biasing means normally urging said armature toward said closed position.

2. The metering valve of claim 1 wherein said stop means is longitudinally adjustable to vary the air gap between said stop and said armature.

3. The metering valve of claim 1 wherein said valve seat member is polyurethane and said armature is sintered iron.

4. The metering valve of claim 1 wherein said biasing means comprises spring means interposed between said stop means and said armature means.

5. The metering valve of claim 1 wherein said inlet and outlet ports include tubes extending therefrom.

6. The metering valve of claim 1 wherein said inlet is connected to a source of fluid and said coil is connected to a driver circuit wherein said valve is operable to apply pulses of fluid to a surface in a manner to form alphanumeric indicia.

7. The metering valve of claim 3 wherein said sintered iron contains phosphorous.

8. The metering valve of claim 3 wherein said valve seat has a durometer hardness of substantially between 85 to 95.

9. The metering valve of claim 3 wherein said valve seat is provided in a generally axial recess in said armature end.

10. The metering valve of claim 3 wherein said armature and said front and rear retainers are fabricated from sintered iron containing phosphorous.

11. The metering valve of claim 1 wherein said stop means is longitudinally adjustable at cooperable threads on said stop means and in said rear retainer.

* * * * *